US012647424B2

(12) United States Patent
Carver

(10) Patent No.: US 12,647,424 B2
(45) Date of Patent: Jun. 2, 2026

(54) METHODS, MEDIUMS, AND SYSTEMS FOR TENANCY MANAGEMENT

(71) Applicant: Waters Technologies Ireland Limited, Dublin (IE)

(72) Inventor: Christopher Carver, Northwich (GB)

(73) Assignee: Waters Technologies Ireland Limited, Dublin (IE)

( * ) Notice: Subject to any disclaimer, the term of this patent is extended or adjusted under 35 U.S.C. 154(b) by 218 days.

(21) Appl. No.: 17/580,839

(22) Filed: Jan. 21, 2022

(65) Prior Publication Data

US 2022/0239661 A1 Jul. 28, 2022

Related U.S. Application Data

(60) Provisional application No. 63/140,604, filed on Jan. 22, 2021.

(51) Int. Cl.
H04L 9/40 (2022.01)
(52) U.S. Cl.
CPC .................................. H04L 63/104 (2013.01)
(58) Field of Classification Search
CPC ... H04L 63/104; G06F 11/1471; G06F 9/5072
See application file for complete search history.

(56) References Cited

U.S. PATENT DOCUMENTS

2013/0111562 A1    5/2013 Lee et al.
2017/0155672 A1*   6/2017 Muthukrishnan ..... H04L 67/535

2017/0331812 A1*  11/2017 Lander ................ H04L 63/0815
2018/0083967 A1*   3/2018 Subramanian .......... H04L 63/10
2020/0125455 A1    4/2020 Neelakanteshwar et al.
2021/0067423 A1*   3/2021 Newman ............. H04L 41/5048
(Continued)

FOREIGN PATENT DOCUMENTS

WO     2018053258 A1    3/2018

OTHER PUBLICATIONS

International Search Report and Written Opinion for International Patent Application No. PCT/IB2022/050553, mailed May 31, 2022.
(Continued)

*Primary Examiner* — Christopher B Robinson
*Assistant Examiner* — Tania M Pena-Santana
(74) *Attorney, Agent, or Firm* — Goodwin Procter LLP

(57) ABSTRACT

Exemplary embodiments provide techniques for creating or modifying a tenancy. The tenancy creation process may be divided into a plurality of independent stages, where each stage provisions services or resources in a cloud computing environment independent of provisioning others of the plurality of services or resources. If the current stage fails, the failure may be detected and programmatically corrected. For example, upon detecting that the first stage has failed, the system may retrieve a retry policy uniquely associated with the first stage and process the retry policy. The progress made by each of the independent stages may be logged, and the log may be used in connection with the retry policy. In some embodiments, relationships within an organization may be modeled by a graph database, which allows permissions to be more efficiently assigned than with other types of data structures.

14 Claims, 10 Drawing Sheets

(56) References Cited

U.S. PATENT DOCUMENTS

| | | | |
|---|---|---|---|
| 2021/0377276 A1* | 12/2021 | Dasari | ................. H04L 63/0853 |
| 2023/0035486 A1* | 2/2023 | Vergara | ................. G06F 9/5077 |

OTHER PUBLICATIONS

International Preliminary Report on Patentability for International Patent Application No. PCT/IB2022/050553, mailed Aug. 3, 2023.

* cited by examiner

METHODS, MEDIUMS, AND SYSTEMS FOR TENANCY MANAGEMENT

CROSS REFERENCE TO RELATED APPLICATION

This application claims the benefit of U.S. Provisional Patent Application No. 63/140,604, filed Jan. 22, 2021, the entire disclosure of which is hereby incorporated by reference.

BACKGROUND

In the context of cloud computing/software-as-a-service (SAAS), multiple groups or organizations may share computing resources. Each entity having access to the resources is sometimes called a "tenant," and their access to the computing resources is referred to as a tenancy. Each tenancy may be associated with one or more users who are capable of accessing resources (processing resources, data, etc.) or services through the shared computing environment. These tenancies must be created and managed, which may involve adding users to, and removing users from, the tenancy, changing the permissions assigned to the users, providing users access to data, and other related actions.

BRIEF SUMMARY

It is contemplated that the embodiments described below may be used separately or in combination. The attached Figures show the embodiments described below as a unified process, although individual parts of that process can be separated in order to achieve advantages as described herein. Furthermore, the summaries below may be described from a certain perspective (e.g., the primary device, the secondary device, the server, another participant in the conversation). It is understood that the invention is not limited to the specific actions as performed by the particular devices identified below. One of ordinary skill in the art will understand that complimentary actions are performed on the other devices, as described more fully in the Detailed Description that follows, in response to the specific actions summarized below. The phrases "in one embodiment," "in another embodiment," etc. are not intended to exclude those embodiments from being used together. For example, if a first embodiment is introduced by "in one embodiment," and a second embodiment is introduced by "in another embodiment," it is contemplated that the first and second embodiments could be used together or separately.

The techniques described herein may be embodied as computer-implemented methods, instructions stored on non-transitory computer readable media, computing apparatuses or systems, or any other suitable technology.

In some embodiments, a system may receive a request to create a tenancy. This request may trigger a tenancy creation process that involves provisioning multiple services or resources in the service platform, the tenancy creation process being divided into a plurality of independent stages. The system may process a first stage of the plurality of independent stages, wherein the first stage provisions one of the plurality of services or resources independent of provisioning others of the plurality of services or resources.

In conventional techniques, tenancy creation tends to be a single, monolithic process. Unfortunately, cloud computing environments tend to be less reliable than conventional computing environments, and server failures may be more common in such an environment. Thus, it is beneficial to plan the tenancy creation process with the expectation that a server could fail before the process is complete. In the conventional monolithic tenancy creation process, failure of a server may leave it unclear as to whether or to what extent the tenancy was created (e.g., whether users were added to a user pool for the tenancy, whether certain permissions were set, etc.). Thus, after a server failure, an administrator typically needs to examine the tenancy data structures and hand-repair them, which is a time-consuming process.

In the above embodiments, the tenancy creation process is divided into multiple independent stages (e.g., provisioning a user pool for the tenancy, creating users in the user pool, etc.). When one of the stages is complete, the stage ends by placing a message on a message queue of the service platform. The message may be configured to trigger an initiation of a subsequent stage of the plurality of independent stages. Accordingly, the next part of the tenancy creation process can be carried out if the current stage is executed properly.

However, if the current stage fails, the failure may be detected and programmatically corrected. For example, upon detecting that the first stage has failed, the system may retrieve a retry policy uniquely associated with the first stage and process the retry policy. Because the tenancy is broken into multiple stages that are independent of each other, different retry policies can be customized to the different stages. For instance, if the current stage is attempting to add users to the user pool, then a retry policy for that stage might check the user pool to determine which users were added before failure, and then continue adding additional users from that point.

It is particularly helpful to separate the creation of the user pool from the other parts of the tenancy creation process. Creating a user pool often involves generating a unique group of settings for the user pool and keeping this part of the process separate (and crafting a suitable retry policy) alleviates much of the hand-tuning alluded to above.

In some embodiments, the progress made by each of the independent stages may be logged. This can be especially helpful for the retry policy, which may be able to use the log to determine how far the current stage was able to proceed before a failure. Therefore, the system may not need to query the state of the tenancy when retrying the current stage (which can require time and processing resources, particularly when the tenancy is stored in a database and represents a large organization)

Some embodiments may further improve performance when the tenancy is created for an organization that is modeled as a group of teams. In this case, permissions in the service platform may be assigned to the teams instead of individual users. Because teams in an organization typically work on the same projects and need access to the same data, this allows permissions to be assigned efficiently and consistently. In addition to avoiding the scenario where an administrator must decide, for each user, which files, services, and other resources the user needs access to, this technique ensures that users do not inadvertently gain access to information that they should not have access to (because they are not part of a team that is working on a project needing access to the data).

In these embodiments, relationships within the organization may be modeled by a graph database, which allows permissions to be more efficiently assigned than with other types of data structures. For example, at least one of the permissions may be modeled as a node in a graph, with the permission node being connected to corresponding team nodes by edges in the graph, the permission node representing access rights for the corresponding team nodes. Alternatively or in addition, at least one of the permissions may be modeled as an edge in a graph that connects a user node in the graph to one or more folder nodes in the graph, each folder node corresponding to a folder of data that connected user nodes are permitted to access based on rights associated with the permission edge.

The tenancy may be created via a graphical user interface. According to one embodiment, the system may receive, via the user interface, a request to create the tenancy. In response, the system my display, in the user interface, a first interface element summarizing a list of teams organized in the tenancy. In the first interface element, the system may receive a selection of one of the teams and, in response, may display in a second interface element of the user interface a list of users in the organization assigned to the team and a list of permissions available to the team with respect to a plurality of applications available to users of the tenancy.

The system may further receive a selection of a permission from among the list of permissions in the second interface element, receive an instruction to assign the permission to the selected team, and update a data structure representing the tenancy to cause the selected team to be assigned the selected permission. The data structure may be, for example, the above-noted graph structure that represents the tenancy. Updating this data structure may involve adding an edge to the graph, the edge extending between a node corresponding to the team and a node corresponding to the selected permission.

In some embodiments, the system may display, in the second interface element, a list of compliant data spaces (e.g., the above-noted folders) to which data may be uploaded, wherein each of the compliant data spaces displayed in the second interface element is assigned to the selected team. The system may receive a selection of a compliant data space from the list, receive an instruction to assign the compliant data space to the selected team, and update a data structure representing the tenancy to cause the selected team to be assigned the selected compliant data space.

In a similar manner, the system may receive a selection of a display element corresponding to a list of users of the tenancy, and may display, in the user interface, the list of users of the tenancy in response to receiving the selection of the display element. The system may receive, via the user interface, a selection of a user from the list of users, receive an instruction to assign the user to one of the teams from the list of teams, and may update a data structure representing the tenancy to cause the selected user to be assigned the selected team. Updating the data structure may involve adding an edge to the graph representing the tenancy, the edge extending between a node corresponding to the selected team and a node corresponding to the selected user.

In a similar manner, the system may receive a selection of a display element corresponding to a list of folders of the tenancy and may display, in the user interface, the list of folders of the tenancy in response to receiving the selection of the display element. The system may receive a selection of a folder from the list of folders, receive an instruction to assign the folder to one of the teams from the list of teams, and may update a data structure representing the tenancy to cause the selected folder to be assigned the selected team. For example, if the data structure is the above-noted graph, updating the data structure may involve adding an edge to the graph representing the tenancy, the edge extending between a node corresponding to the selected team and a node corresponding to the selected folder.

In some embodiments, the system may receive a selection of a team addition element in the first interface element and, in response, may prompt for a set of permissions to be assigned to a new team. The system may update a data structure representing the tenancy to cause the team to be added to the tenancy. For example, when the data structure is the above-noted graph, the system may add a new node to the graph corresponding to the new team, the new node connected to nodes corresponding to the set of permissions to be assigned to the new team.

In further embodiments, third parties (e.g., third-party applications) may generate and deploy lists of permissions for the tenancy. This allows the system to serve as a coordinator for permissions across a multitude of applications.

For example, the application or third party may provide a list of permissions for the application to a continuous integration and deployment (CI/CD) tool. The CI/CD tool allows the list of permissions to be versioned so that the appropriate version can be deployed at any given time; it also facilitates rolling back to a previous version.

The list of permissions may be uploaded from the CI/CD tool to an image repository. The image repository allows the permissions to be baked into a docker image that includes (e.g.) a versioned json file and .NET console application that includes logic configured to execute a Representational State Transfer (REST) call that updates the application's permission set in the tenancy. The docker image may be versioned to mirror a version of the list of permissions. The list of permissions and the console application may be stored together as part of a docker image. This container can then be conveniently executed by a container management system, which may use the container's version identifier to ensure that the correct and current container is deployed.

From the image repository, the list of permissions (e.g., in containerized form) may be provided to a permission setting application programming interface (API). A permission setting procedure may be called through the permission setting application programming interface to modify a data structure representing the tenancy, the data structure being modified to include the access permissions from the list of permissions.

For example, the above-noted console application may be executed as a one-time operation for deployment of the containerized operation. The one-time operation may be executed using a credential configured to access the permission setting API, such as a cryptographic key. In some cases, the permission setting API may be accessible only using the credential. In some cases, the credential may be used by the tenancy solely to update the application's permission set in the tenancy. These safeguards help to prevent accidental access to the API by other autonomous services.

In some embodiments, the data structure may be the above-noted graph including a first set of nodes representing teams of users and a second set of nodes representing permission claims. Modifying the data structure may involve creating a new permission set parent node encompassing a first set of permission nodes already present in the graph while respective teams assigned to the first set of permission nodes remain connected to the first set of permission nodes. A second set of permission nodes may be created representing new permissions assigned in the list of permissions that were not already present in the graph, the second set of permission nodes being encompassed by the new permission set parent node. The new permission set parent node may be assigned to a team identified in the list of permissions.

As noted above, versioning the permission set facilitates rolling back to an earlier version. Upon detecting a rollback condition, the system may reconnect the team identified in the list of permissions to an old permission set parent node. Any edges in the graph representing permissions in the list of permissions that were not previously assigned to the team identified in the list of permissions may be deleted, as may be the second set of permission nodes and the new permission set parent node. With these procedures, the permission set can be efficiently and safely rolled back to the prior version.

BRIEF DESCRIPTION OF THE SEVERAL
VIEWS OF THE DRAWINGS

To easily identify the discussion of any particular element or act, the most significant digit or digits in a reference number refer to the figure number in which that element is first introduced.

DETAILED DESCRIPTION

Figure 1:
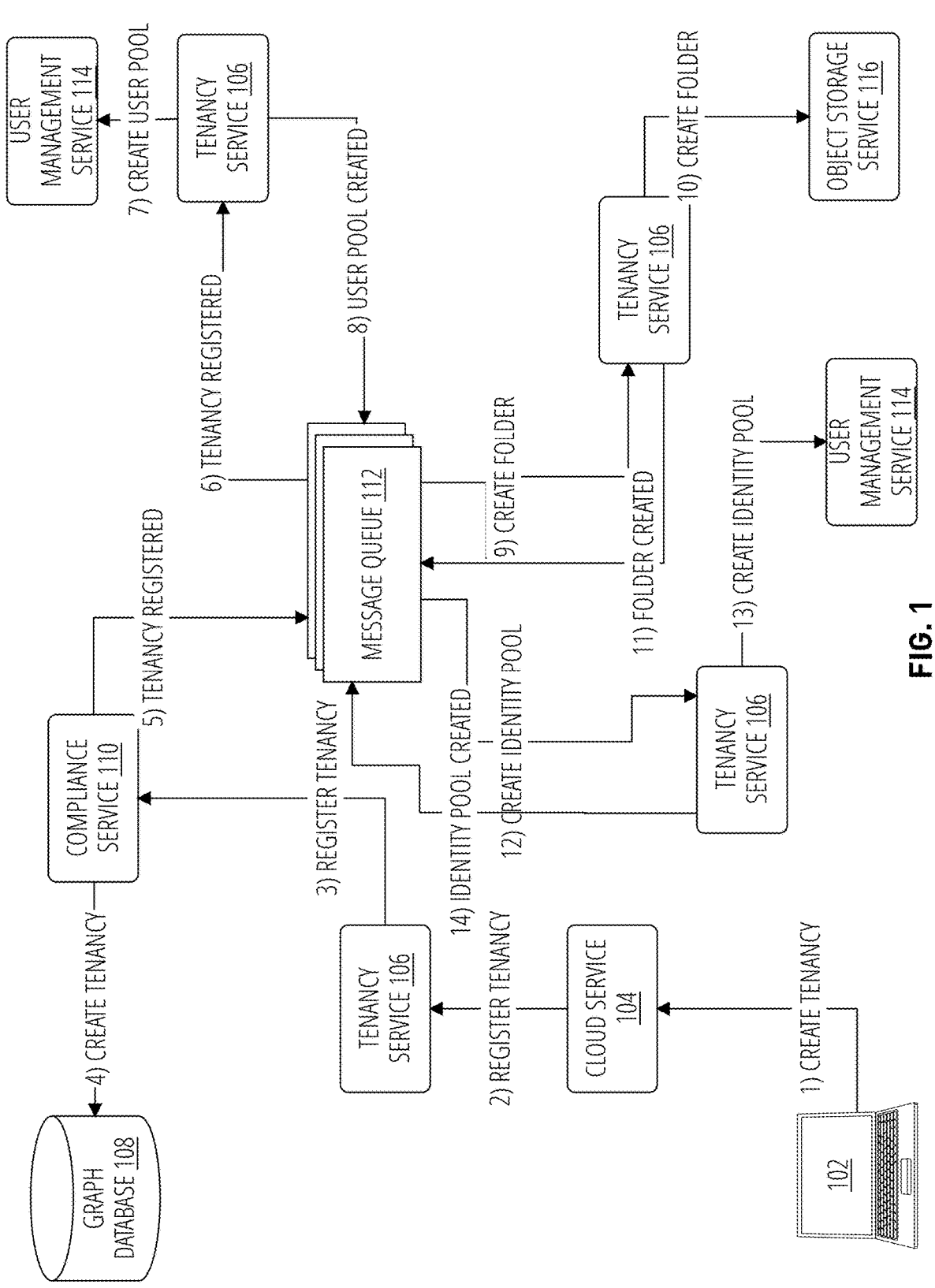
FIG. 1 depicts an exemplary data flow diagram depicting information exchange in a tenancy management environment in accordance with one embodiment.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1 depicts an exemplary data flow diagram for a tenancy management environment. Each of the steps described below and designated on the arrows between different devices and services in FIG. 1 may form a stage of the tenancy creation process that is independent of the other stages. Progress through each stage may be logged, and each stage may be associated with a retry policy designed for, and uniquely associated with, that stage. If a stage fails (e.g., due to a server or other type of failure), the retry policy can be attempted and/or the tenancy creation process may be aborted. Because each stage is independent, a stage can fail without disrupting the entire tenancy creation process. Moreover, because each stage is a relatively small portion of the overall tenancy creation process, it may be simpler for the tenancy creation process as a whole to recover from a failure, since the actions that need to be checked and potentially re-performed (or performed for the first time) are a relatively small subset of the overall actions needed to create the tenancy. The progress of each stage may be logged by the tenancy service 106 (or another service), further facilitating recovery from a failure.

Each stage may end by placing a message on a queue, such as the message queue 112. An example of a message queue suitable for use with exemplary embodiments is the Simple Queueing Service (SQS) from AWS. The message may be configured to instruct a next stage (a stage intended to follow the stage that just finished) to begin processing. For example, the message may be pushed to the next service that performs the next stage, or the next service may periodically query the message queue 112 to determine if a message instructing it to begin processing is waiting.

Note that, in FIG. 1, the tenancy service 106 is designated by a common reference number. It is contemplated that a single instance of a service may function as the tenancy service 106, or that the actions at each stage may be handled by different autonomous services. In other words, each stage may optionally be separated into its own service, which may be more efficient when tenancy management is deployed at scale.

As a first stage, a client device 102 may instruct a cloud service 104 to create a tenancy. As noted above, a tenancy may be a designated collection of services and/or resources in a cloud computing environment accessible to a defined pool of users. An example of a cloud service 104 suitable for use with exemplary embodiments is provided by Amazon Web Services (AWS), which includes the AWS Cognito service for creating, managing, authenticating, and authorizing a user pool. One of ordinary skill in the art will recognize other cloud computing platforms and services suitable for use with the embodiments described herein. The client device 102 may instruct the cloud service 104 to create the tenancy via a graphical user interface, such as the exemplary interface depicted in FIG. 3. The instruction to create the tenancy may include a list of users to be added to the tenancy's user pool, a list of teams that the users may be organized into (and assignments of the users to the teams), a list of permissions assigned to each team, a list of compliant workspaces (e.g., data storage folders) accessible to the teams, etc.

Note that the instruction may also be an instruction to modify a tenancy (e.g., to modify the user pool, permissions, teams, etc.). The stages described below may be carried out in a similar manner in response to a modification instruction, except that it may not be necessary to perform certain initial tenancy creation steps.

If this stage fails, it may mean that the instruction to create the tenancy could not be successfully transmitted to the cloud service 104. A retry policy for this stage may involve checking the network connection between the client device 102 and the tenancy service 106, ensuring that the tenancy service 106 is online and processing requests, checking the format of the instruction, etc. This stage can also fail gracefully by simply aborting the stage and returning an error message, because the cloud service 104 has, as of yet, not begun creating the tenancy.

In some embodiments, the first stage may be an exception in that it does not place a message on the message queue 112 when it completes. Instead, the first stage may expressly call into the cloud service 104, which may pick up the tenancy creation process directly.

As a second stage, the cloud service 104 may register the tenancy with a tenancy service 106. The tenancy service 106 may be an autonomous service that interfaces with the cloud service 104. An autonomous service may be a computing service that is independent of other services for its functionality. Although it may asynchronously provide information that may be consumed by other services (and may asynchronously consume information from other services), autonomous services may refrain from assisting other services synchronously through behaviors. The tenancy service 106 may be hosted by the cloud computing environment providing the cloud service 104 or may be separate from the cloud service 104.

In the second stage, the tenancy service may take initial steps to create the tenancy, such as assigning a name and server(s) to the tenancy, provisioning initial resources for the tenancy, designating the message queue 112 for the tenancy creation process, etc. Upon completion, each of these steps may be logged in a log so that, if the second stage fails, the steps of registering the tenancy with the tenancy service 106 may be retried. The second stage may also be an exception in that a message need not be placed on the message queue 112 when the second stage completes. Instead, the cloud service 104 may send an instruction directly to the tenancy service 106.

As a third stage, the tenancy may be represented as a graph (see, e.g., FIG. 5) stored in a graph database 108. An example of a suitable graph database 108 is the Neptune database from AWS. In this example, the third stage may encompass steps 3, 4, and 5 in FIG. 1. To this end, the tenancy service 106 may register the tenancy with a compliance service 110. The compliance service 110 may be an autonomous service and may be configured to interact with the graph database 108 to generate or modify a representation of the tenancy stored in the graph database 108. The compliance service may, at step 4, instruct the graph database 108 to create suitable nodes and edges in the graph database 108. As noted below in connection with FIG. 5, users, teams, and compliant workspaces may be stored as nodes in the graph structure. Permissions may be represented as edges between the nodes or as nodes, depending on the context. The compliance service 110 may access the list of users, teams, compliant workspaces, and permissions from the original instruction to create the tenancy and may successively create an appropriate structure in the graph for each item in the list.

As each node and edge is created, the progress of the compliance service 110 may be stored in a log. In the event of a failure, a retry policy for the third stage may involve checking the log against the original instruction to create the tenancy and identifying how far down the list the compliance service 110 has progressed. Optionally, the retry policy may attempt to reconcile those items in the list which are marked as being completed (e.g., those represented in the progress log) against the graph data structure stored in the graph database 108. The retry policy may then pick up instructing the compliance service 110 to continue creating structures in the graph database 108 from where it left off at the time of the failure.

When the compliance service 110 finishes creating the graph data structure representing the tenancy in the graph database 108, the compliance service 110 may report the registration of the tenancy in a message to the message queue 112.

As a fourth stage, a user pool may be created for the tenancy. The fourth stage may encompass steps 6, 7, and 8 in FIG. 1. The user pool may represent the list of users capable of interacting with the tenancy, where each user in the user pool may be assigned permissions that allow that user to access application services, compliant workspaces, etc. In some embodiments, users are not assigned permissions directly, but are instead assigned to teams (where each team carries its own set of permissions). In some cases, users may be given administration rights that allow them to create or modify tenancies.

To that end, the tenancy service, upon being informed from the message queue 112 that the tenancy has been registered, may create a user pool with a user management service 114. The user management service 114 may be responsible for performing user sign up, sign-in, and access control (e.g., for applications available to the tenancy). The user management service 114 may register the users with the applications, manage login credentials, handle authentication, etc. The user management service 114 may also provide security services for the applications, such as multifactor authentication, encryption, etc. The user management service 114 may coordinate access to backend resources for the application (such as allowing the application to access the compliant workspaces associated with the tenancy. An example of a suitable user management service 114 is Cognito from AWS.

At this stage, the tenancy service 106 may progress through the list of users from the tenancy creation instruction/graph database 108 and create credentials for each user with the applications and other services accessible to the tenancy (which may also be provided as part of the tenancy creation instruction). As each user's access is set through the user management service 114, successes may be logged. If this stage should fail, then a retry policy may involve consulting the log to determine how far into the list of application/services/users the tenancy service 106 had successfully registered with the user management service 114 and may pick up user pool creation from there. Optionally, the retry policy may query the user management service 114 to verify that the creation of the user pool had progressed to the point indicated in the log.

When the user pool is successfully created with the user management service 114, the tenancy service may transmit a message into the message queue 112.

As a fifth stage, compliant data spaces (e.g., folders) for the tenancy may be created in an object storage service 116. An example of an object storage service 116 is the Simple Storage Service (S3) from AWS. The fifth stage may encompass steps 9, 10, and 11 in FIG. 1.

In this stage, the tenancy service 106 may retrieve a list of compliant workspaces (folders) from the instruction to create the tenancy and/or the graph database 108. The tenancy service may, for each workspace, create a corresponding folder with the object storage service 116. The tenancy service may assign access rights to the workspaces based on the permissions in the instruction/graph database 108. As above, each creation may be logged and, if this stage should fail, the retry policy may pick up creating folders where the log left off (potentially after verifying the progress in the log by querying the object storage service 116). A message may then be placed on the message queue 112 to trigger the next stage.

As a sixth stage, an identity pool for the tenancy may be created with a user management service 114. The sixth stage may encompass steps 12 and 13 in FIG. 1.

An example of a user management service 114 is the above-noted AWS Cognito, which is also used to create and manage the user pool. A difference between the user pool created in the fourth stage and the identity pool created in the sixth stage is that the user pool is generally used for authentication, whereas the identity pool is for access control. In other words, the user pool is created so that users can verify their identity when they wish to use cloud resources, including cloud-supported applications. Among other things, a user pool may be used to support sign-up and sign-in interfaces for an application, access and manage user data, track user device, location, and IP addresses, adapt to sign-in requests of different risk levels, and assign a custom authentication flow for an application. The identity pool is used to, among other things, give users access to cloud-based resources and generate temporary credentials for unauthenticated users.

In this stage, the tenancy service 106 may retrieve a list of permissions from the instruction to create the tenancy and/or the graph database 108. The tenancy service 106 may, for each permission, determine corresponding applications/services/resources that are implicated within the cloud service 104 and assign access to the corresponding teams and users in the user management service 114. As above, each assignment of rights may be logged and, if this stage should fail, the retry policy may pick up assigning rights where the log left off (potentially after verifying the progress in the log by querying the user management service 114).

Optionally, a message may be placed into the message queue 112 upon the completion of the sixth stage. In embodiments where the sixth stage represents the final stage, it may not be necessary to place such a message on the message queue 112, because there are no further services to trigger. The tenancy service 106 may optionally report that the tenancy has been successfully created to the cloud service 104, which may relay the report back to the client device 102.

Figure 2:
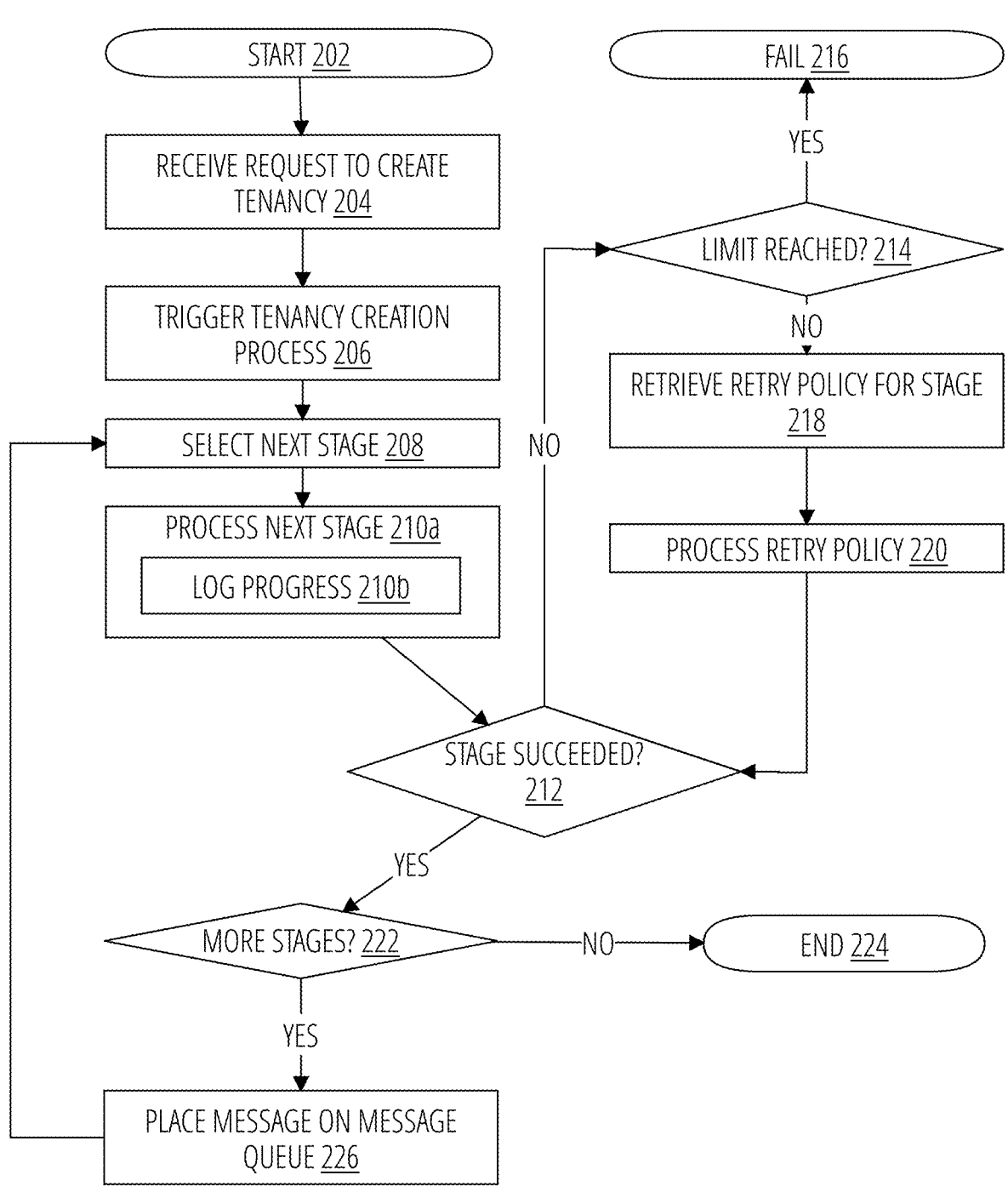
FIG. 2 is a flowchart depicting exemplary logic for creating a tenancy accordance with one embodiment.

Next, FIG. 2 depicts logic describing a tenancy creation process, which may be used with the above-described embodiment (or other suitable embodiments). The logic may be embodied as a computer-implemented method or as instructions stored on a non-transitory computer-readable storage medium and may be configured to cause a processor to perform the logical blocks included in FIG. 2. In some embodiments, the logic may be performed by a computing system configured to perform the logical blocks included in FIG. 2, potentially through an autonomous service such as the tenancy service 106.

Processing begins at start block 202. At block 204, the system may receive a request to create (or modify) a tenancy. For example, the system may receive an instruction from a client device that describes the tenancy, including a list of users organized into teams, compliant workspaces (folders), permissions or access rights for the compliant workspaces and application services, and any other information needed to create the tenancy.

At block 206, a tenancy creation process may be triggered in response to receiving the request. In the above example from FIG. 1, this may involve the cloud service 104 calling into the tenancy service 106 (e.g., via an application programming interface) to instruct the tenancy service 106 to begin creating and registering the tenancy.

At block 208, the system (e.g., via the tenancy service 106) may select the next independent stage of tenancy creation for execution. Initially, this may be the stage of registering the tenancy, and the stages may progress from there as described in connection with FIG. 1. The next stage may be processed in block 210*a*, which may involve performing the steps particular to that stage (e.g., as described above). Optionally, at block 210*b*, the system may log the progress of performing the steps of the stage.

At decision block 212, the system may determine if the stage has succeeded or failed. For example, the system may receive a success message indicating that the steps of the stage have been executed successfully, or an error message indicating a failure (e.g., due to failure of a server or an instruction that could not be executed). If the stage succeeded at decision block 212, the system may determine if more stages remain to be processed at decision block 222. If not (i.e., tenancy creation is complete), then processing may proceed to done block 224; at this point, the success may optionally be reported, and processing may end. If there are more stages to process, then at block 226 the system may place a message on the message queue configured to cause the tenancy service to begin executing the next stage. Processing may then return to block 208 and the next stage for execution may be selected and processed.

If, at decision block 212 it is determined that processing of the current stage failed, then at block 214 the system may determine if a maximum number of retries has already been met or exceeded. An administrator may define a limit on the number of retries that may be attempting, to prevent the system from looping endlessly when the retry policy cannot succeed. If the limit is reached at decision block 214, then processing may proceed to fail block 216 and the system may report an error and terminate processing.

Otherwise, processing may proceed to block 218, where the retry policy specific to the current stage may be retrieved (e.g., from a retry policy repository). The retry policy may be processed in block 220, which may involve consulting the log constructed at block 210*b* and attempting or reattempting any steps of the current stage that are not accounted for in the log. Optionally, the system may query a service or storage location associated with the stage to determine whether the actions in the log were, in fact, successfully performed (or, if no log exists, to determine how far the stage was able to get). Processing may then return to decision block 212 to determine if the retry attempt succeeded or failed. In the case of a failure, a counter associated with the stage's retry attempts may be incremented, which may be used to determine if the limit has been reached when decision block 214 is again performed.

Figure 3:
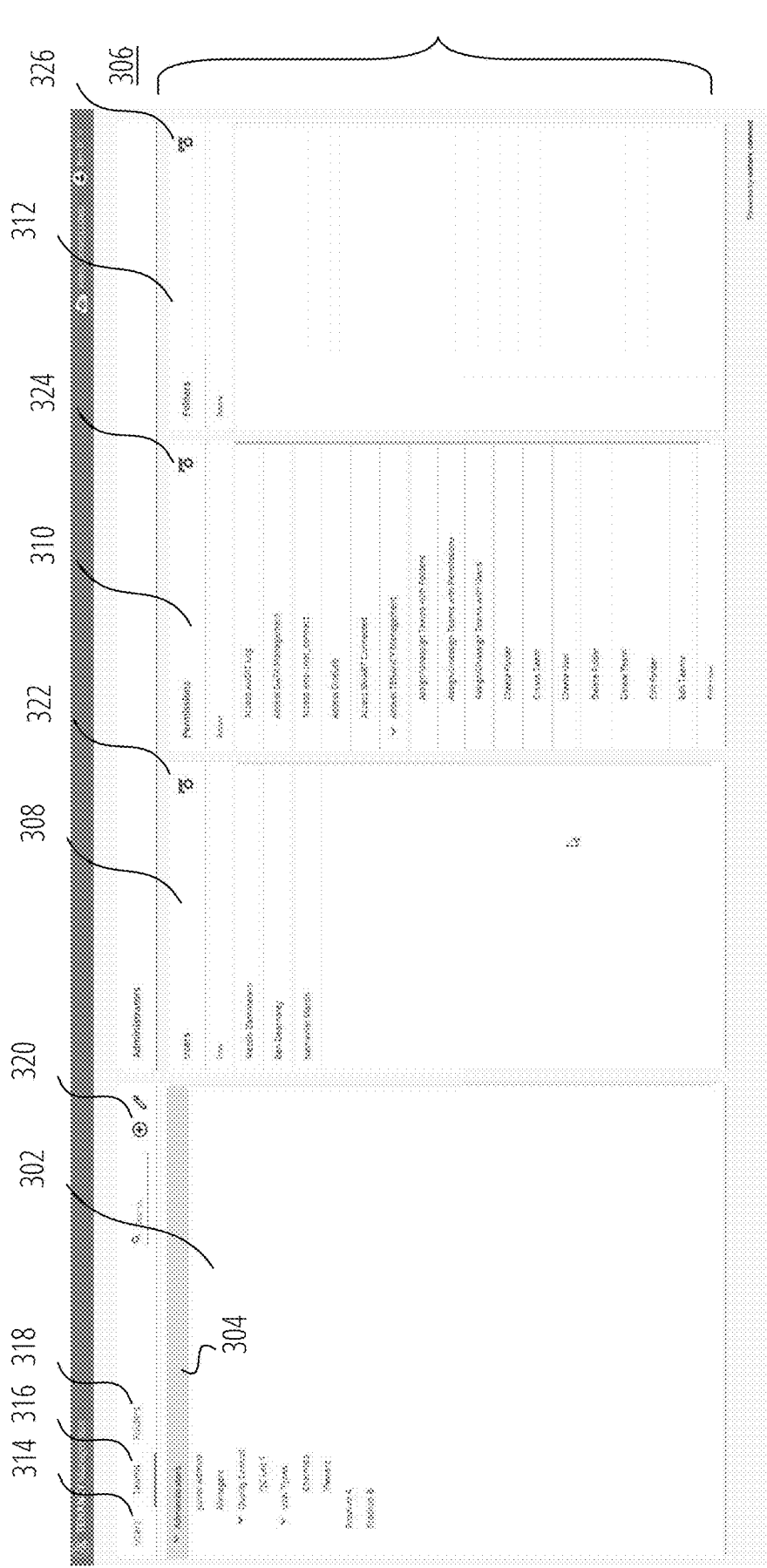
FIG. 3 depicts a graphical user interface suitable for creating or modifying a tenancy in accordance with one embodiment.

FIG. 3 is an example of a user interface suitable for creating or modifying a tenancy according to exemplary embodiments. The interface may be presented, for example, on a client device 102 of an administrator with rights to create or modify the tenancy.

The interface may include a number of interface elements allowing a user to view, select, and modify various aspects of a tenancy. In general, a tenancy may be defined in terms of users that are organized into teams that have permissions for applications and data workspaces (folders). Based on which aspect is currently being edited (e.g., users, teams, or folders), a first interface element 302 may display the constituents of that aspect. For example, if the user selects a user display element 314, the first interface element 302 may display a list of the users that exist in the tenancy (or that are currently being added to the tenancy). If a user selects a teams display element 316, the first interface element 302 may display a list of the teams that exist in the tenancy (or that are currently being added to the tenancy). If a user selects a folders display element 318, the first interface element 302 may display a list of the complaint workspaces (folders) that are accessible to the tenancy (or that are currently being added to the tenancy).

A user may select an element in the first interface element 302 in order to cause information pertaining to the selection to appear in a second interface element 306. The second interface element 306 may be broken down into multiple sections, each displaying relevant data on related tenancy aspects.

For example, FIG. 3 depicts a situation where the user has selected the teams display element 316, causing a list of teams in the tenancy to be displayed in the first interface element 302. A team addition element 320 allows a user to add new teams to the list (similar addition elements may be displayed in the users and folders views). Upon selecting a selected team 304, the second interface element 306 displays relevant information about the selected team 304.

For instance, a first section of the second interface element 306 displays a list of users 308 in the selected team 304. A user editing element 322 allows new users to be created and added to the team, or existing users in the tenancy but not currently in the team to be added. Similarly, a list of permissions 310 associated with the team and related permissions editing element 324 are displayed in a second section of the second interface element 306, and a list of folders 312 and folders editing element 326 are displayed in a third section of the second interface element 306.

The sections of the second interface element 306 may vary depending on which aspect is selected in the first interface element 302. For example, FIG. 3 depicts a team, the users in the team, the permissions assigned to the team, and the folders accessible to the team. If the first interface element 302 were used to display a list of users in the tenancy, the second interface element might provide a list of teams that the user is assigned to. If the first interface element 302 were used to display a list of folders in the tenancy, then the second interface element might display a list of the teams that had access to the folders and the different permissions that each team has with respect to teach folder (e.g., read/write/view/etc.).

By using the user editing element 322, permissions editing element 324, folders editing element 326, etc. In the second interface element 306, as well as the team addition element 320 of the first interface element 302, a user can create a tenancy from scratch or modify an existing tenancy. For instance, a user might first define the users in the tenancy after selecting the user display element 314, and then might add a list of folders using the folders display element 318. The user might then select the teams display element 316 to add teams, organize the users into the teams, and assign access rights for the folders to the teams. In the teams interface, the user might also assign application permissions to the team. When the user is satisfied with the organization of the tenancy, the user may confirm their selections and the information about the tenancy may be loaded into a tenancy creation instruction to be sent to the cloud service 104.

A procedure for allowing a third-party application or service to create or update a tenancy is described in more detail in connection with FIG. 8 and FIG. 9. Before addressing these roll-out procedures, a technique for displaying and updating the interface of FIG. 3 is first described in FIG. 4, and more details about the graph representation of the tenancy are described in connection with FIG. 5-FIG. 7B.

Figure 4:
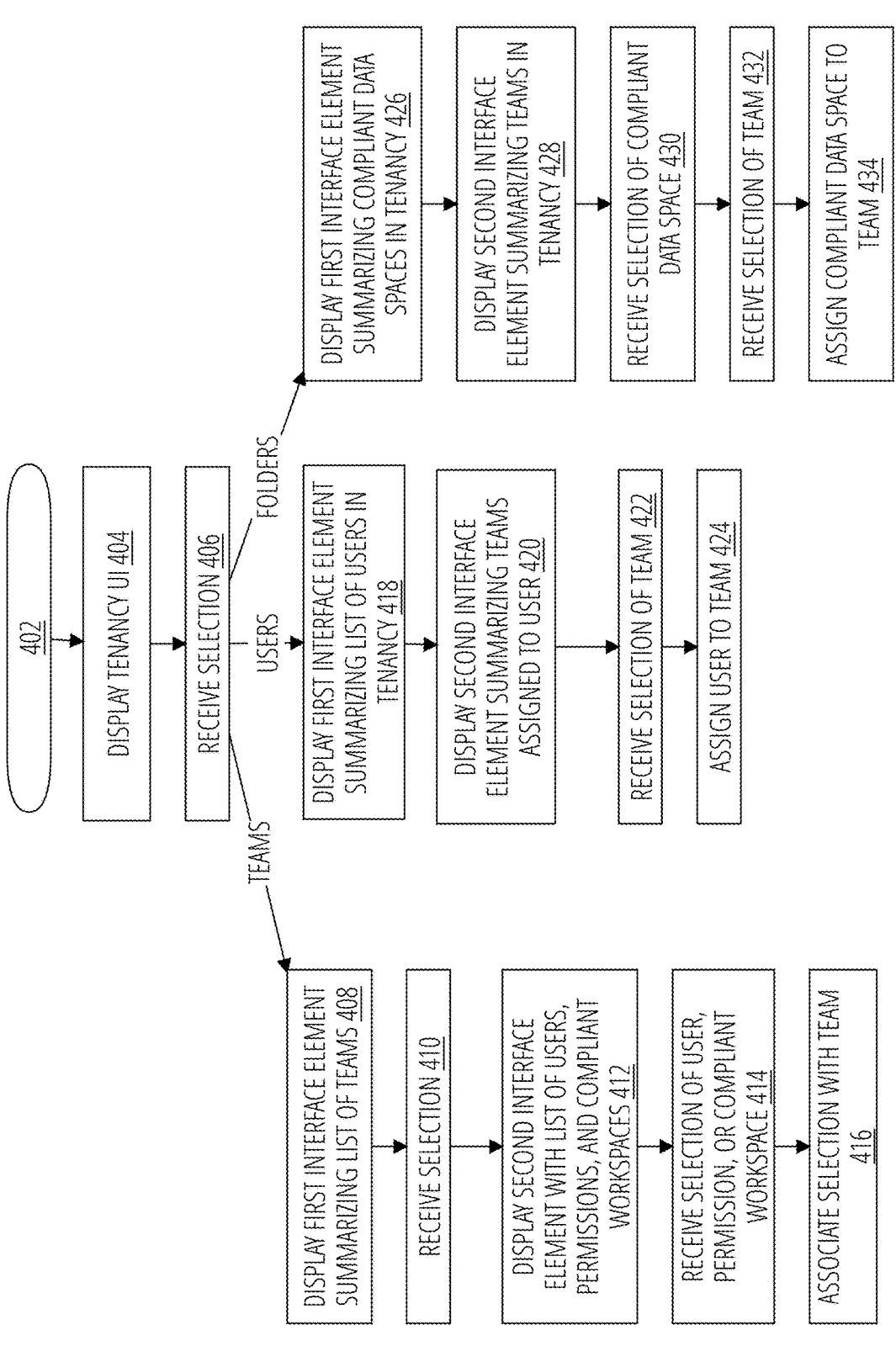
FIG. 4 is a flowchart describing various ways for interacting with a tenancy management user interface in accordance with one embodiment.

As shown in FIG. 4, exemplary interface update logic beings at start block 402. At block 404, the system displays a tenancy user interface, such as the one depicted in FIG. 3. The tenancy user interface may have a first interface element 302, a second interface element 306, and one or more selectable elements (such as user display element 314, teams display element 316, folders display element 318, etc.). At block 406, the system may receive a selection of one of these elements.

If the element selected is the teams display element 316, then at block 408, the system may display, in the first interface element 302, a list of teams that currently exist in the tenancy. The user may use the first interface element 302 to add new teams to the tenancy or remove existing teams from the tenancy. When the user is ready to create or edit the details of a team, they may select a team in the first interface element 302 (in response to which, the system receives a selection of the team at block 410).

In response to receiving the selection of the team, at block 412 the system may display, in the second interface element 306, a list of users, permissions, and compliant workspaces (folders) currently associated with the team. If desired, the user may use a creation element to create a new user, permission, or compliant workspace to be associated with the team, or display a user, folder, or permission that exists in the tenancy but is not currently associated with the teams.

At block 414, the system may receive a selection of a user, permission, or compliant workspace. This may be a user, permission, or compliant workspace currently associated with the team which is selected for editing, or a user, permission or compliant workspace not yet associated with the team that the user desires to add to the team. The user may make any changes necessary to the user, permission, or workspace, and at block 416 the user, permission, or workspace may be associated with the team. This may involve updating a graph of the tenancy based on the changes made in the interface.

If the selection received at block 406 is a selection of the user display element 314, then at block 418 the system may display, in the first interface element 302, a list of users currently in the tenancy. The system may receive a selection of one of the users in the list. At block 420, the system may display, in the second interface element 306 a summary of the teams that the selected user is currently assigned to in the tenancy. The administrator may create a new team or edit an existing team, and the system may receive a selection of one of the teams in the tenancy at block 422. At block 424, the system may receive an instruction to assign the user to the selected team and may, in response, update the graph structure representing the team to add an edge between the user and the team.

Some exemplary embodiments organize the tenancy around teams rather than users. Thus, permissions and access rights are not generally assigned directly to users (although this may be possible in some embodiments). Instead, such rights are managed at the team level, and so when the user display element 314 is selected, the administrator may be limited to assigning the user to a team and may not be permitted to assign access rights directly to the user at this stage.

If the selection at block 406 is a selection of the folders display element 318, the system may display a list of the complaint data spaces (folders) available in the tenancy in the first interface element 302 at block 426. An administrative user may select one of the compliant data spaces in the first interface element. At block 428, the system may display a list of teams currently associated with the selected compliant data space in the tenancy. An administrator can also use the second interface element 306 to display a list of teams not currently associated with the compliant data space, and may receive a selection of one of the teams not currently associated with the compliant data space and may, at block 434, assign the compliant data space to the team. This may involve updating the graph data structure representing the tenancy to add an edge between a node representing the team and a node representing the compliant data space.

Figure 5:
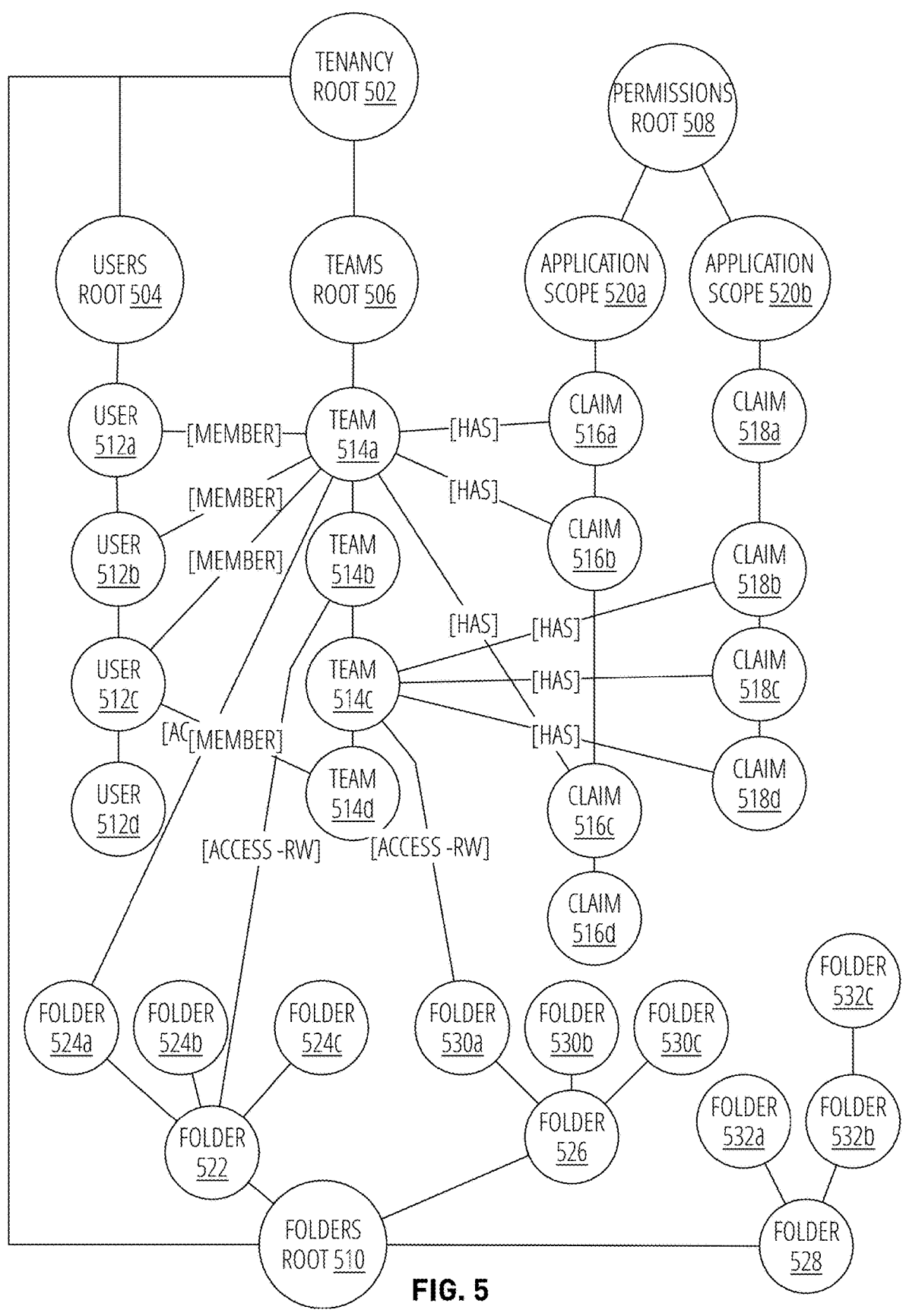
FIG. 5 depicts an example of a graph data structure suitable for representing a tenancy.

An example of a graph data structure representing a tenancy is now described in connection with FIG. 5.

The tenancy as a whole may be associated with a tenancy root 502, which is a node in the graph that other categories of nodes may be added off of. The tenancy root 502 may be associated with a tenancy-specific identifier and represents an access point for the tenancy graph, which allows the compliance service 110 to retrieve and modify the tenancy graph using the identifier.

Below the tenancy root, a number of organizing nodes (a users root 504, a teams root 506, and a folders root 510) may be connected by an edge. Separately, the applications available to the tenancy may each be associated with their own nodes (application scope 520*a*, application scope 520*b*, etc.), which represents the application services that may be available to any tenancy. The application scopes may be organized under a permissions root 508.

Each of the users in the tenancy may have a user node 512*a, b, c, . . . .* Each team in the tenancy may be associated with a team node team node 514*a, b, c, . . . .* Each folder may be associated with a folder node 522, 526 528. Folders may be arranged hierarchically into an organization of subfolders 524*a, b, c,* 530*a, b, c,* 532*a, b, c,* etc.

Each application scope 520*a, b, . . .* may be associated with one or more claims 516*a, b, c, . . . ,* 518*a, b, c, . . . .* The claims may represent access to a particular functionality or service provided by a given application.

A user's membership in a team may be represented by an edge between the user's node and the team's node. A team's access to a given application scope claim or folder may be represented by an edge between the team and the claim or folder. Edges may carry information, such as the extent of the access rights. For example, a "read" edge between a team and a folder may designate that the team is provided with read rights to the folder but cannot write to the folder. A "read/write" edge may indicate that the team can both read from and write to the folder. Other types of edges (such as those between a team and an application scope claim) may indicate that the team has full permission to utilize the functionality or services represented by the connected node.

When a user uses (e.g.) the interface of FIG. 3 to update an existing tenancy, the above-described graph may be modified. FIG. 6A—FIG. 7B depict exemplary techniques for rolling out a change to the permissions assignments in a tenancy and rolling that change back, if desired.

Figures 6A, 6B:
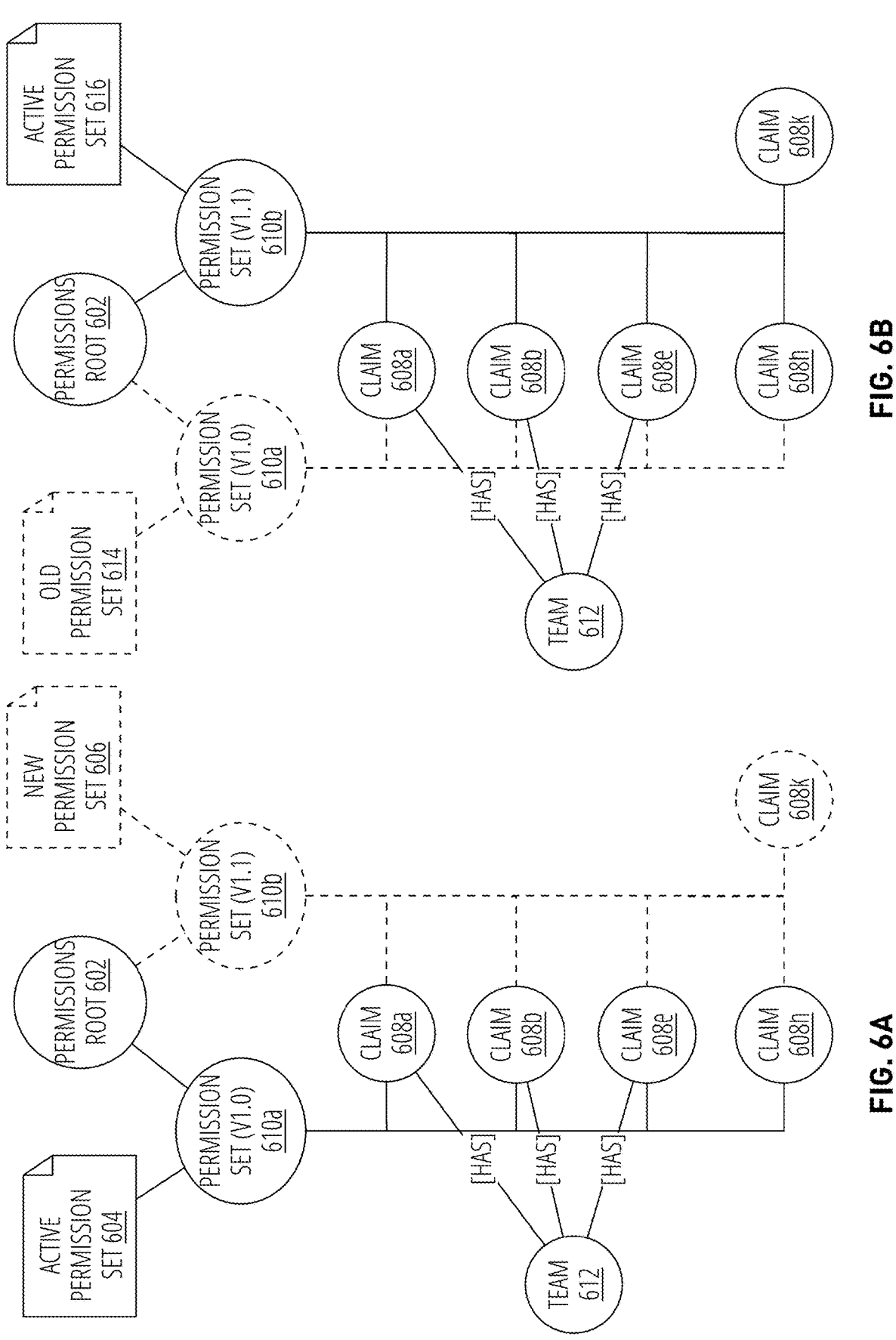
FIG. 6A depicts a data structure for a tenancy at a first time before a new permission set is deployed in accordance with one embodiment.
FIG. 6B depicts the data structure of FIG. 6A at a second time after a new permission set is deployed in accordance with one embodiment.

FIG. 6A depicts the graph structure with an existing active permission set 604, representing the permissions granted to each team. the active permission set may be included in the instruction to create or modify the tenancy, as noted above. The active permission set may define or be translated into a set of claims 608*a, b, c, . . .* that the teams may be able to access and/or a set of edges to folders that the team is able to read from or write to. This may be indicated by a node representing the permission set 610*a* under a permissions root 602 in the graph.

When a user modifies the tenancy and attempts to deploy a new permission set 606, a new node representing the permission set 610*b* may be created. At this time, the permissions root 602 continues to connect to the permission set 610*a* defined by the active permission set 604, and so no changes to the teams' permissions have yet been made. Any new claims (such as new claim 608k) may be represented by new inactive nodes connected to the team 612 by inactive edges, while new folder permissions may be represented by new inactive edges. These edges and nodes may not affect the permissions and access rights available to the teams until they are made active.

Figures 7A, 7B:
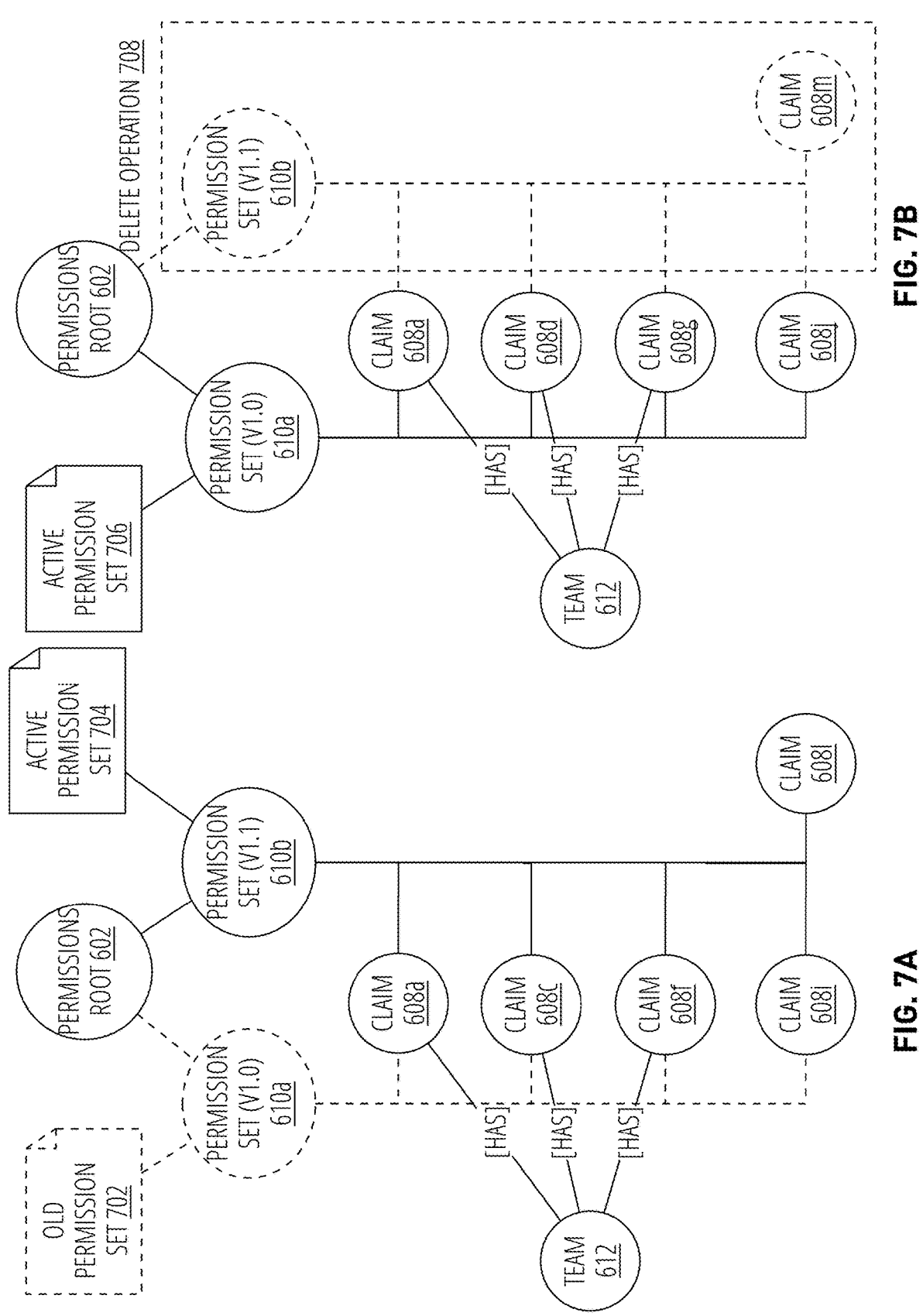
FIG. 7A depicts the data structure of FIG. 6A at the second time before rolling back to the original permission set in accordance with one embodiment.
FIG. 7B depicts the data structure of FIG. 7A at a third time after rolling back to the original permission set in accordance with one embodiment.

For example, in FIG. 6B, the changes are committed by making the connections coming from the old permission set 614 (representing the former active permission set 604) inactive, while the previously inactive connections and nodes from the new permission set 606 are made active (thus rendering the former new permission set 606 the current active permission set 616. The old connections, now inactive, are maintained in case they need to be rolled back (e.g., because the administrator opts to revert to an earlier state in the permission set, or because the rollout of the new permission set fails). If the permission set needs to be rolled back, this process can simply be reversed, as shown in FIG. 7A (with the new permission set being the active permission set 704 and the previous permission set as an old permission set 702) and FIG. 7B (where the permissions sets have rolled back, so the old permission set 702 is made active and hence becomes the active permission set 706). As shown in FIG. 7B, any nodes that are no longer needed when the permission set is rolled back (e.g., those nodes created by the previously active permission set 704) may optionally be deleted (in delete operation 708).

Figure 8:
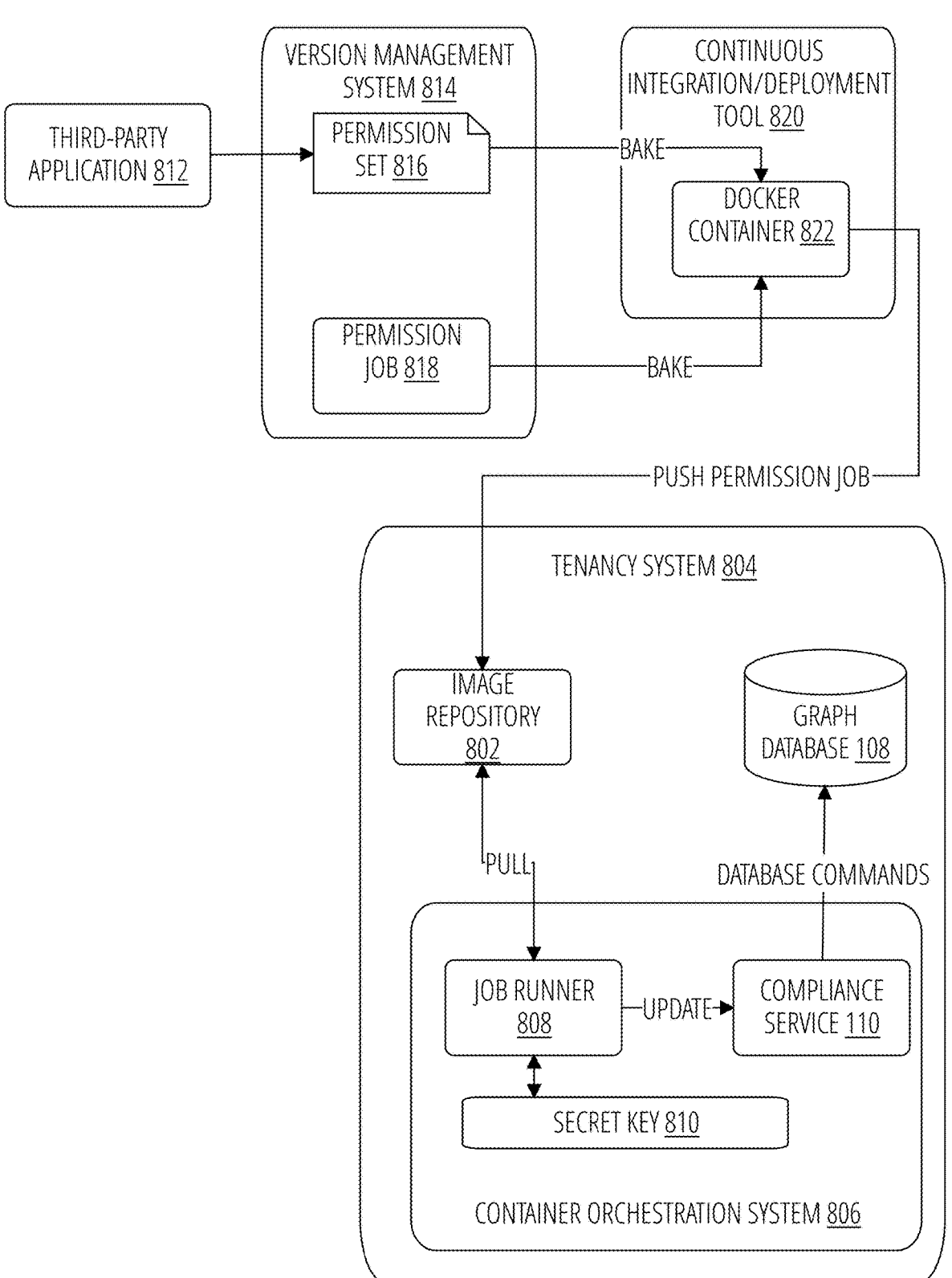
FIG. 8 depicts an environment suitable for deploying a permission set in accordance with one embodiment.

FIG. 8 depicts an exemplary environment for rolling out a permission set as described above, while FIG. 9 is a flowchart describing exemplary logic for performing a rollout. For conciseness, these two figures will be discussed together below.

Figure 9:
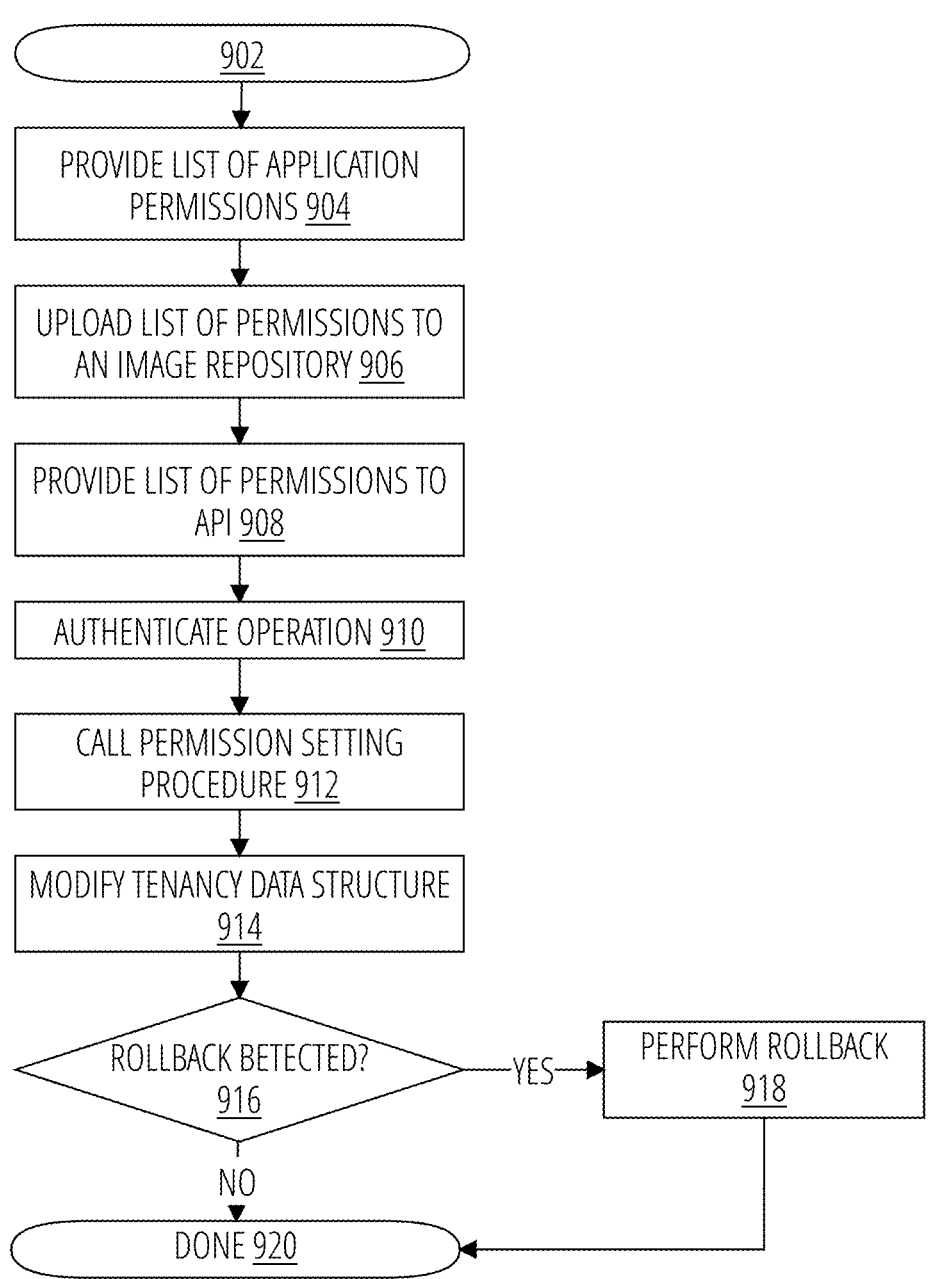
FIG. 9 is a flowchart describing logic for deploying a permission set in accordance with one embodiment.

In order to roll out a new permission set, a third-party application 812, which may be an application provided by any suitable entity, may upload a permission set 816 to a version management system 814 (block 904 of FIG. 9). One example of a version management system 814 suitable for use with exemplary embodiments is BitBucket, a Git-based source code repository hosting service provided by Atlassian Corp. of Sydney, Australia. The version management system 814 may also receive, or may create, a permission job 818. The permission job 818 may include a versioned permission set json file and a .NET console application that contains logic needed to execute a REST call to the compliance service 110 to add or update an application's permission set in the tenancy's graph structure.

The version management system 814 may bake the permission set 816 and permission job 818 into a docker container 822 in a continuous integration/deployment tool 820. An example of a suitable continuous integration/deployment tool 820 is the Bamboo CI/CD system. The docker image may be versioned to mirror the version of the new permission set and uploaded to an image repository 802 in a tenancy system 804 (block 906). An example of a suitable image repository 802 is the AWS Elastic Container Registry (ECR).

The permission job may be executed as a one-time operation as a Kubernetes job. To that end, a job runner 808 of a container orchestration system 806 (e.g., AWS Elastic Kubernetes Service) may pull the docker image from the image repository 802 and executed with a secret key 810 mounted from the Kubernetes secret store. This secret key 810 may be used as a credential to access the compliance service 110, and in particular a permission setting update API offered by the compliance service 110 (block 908). This API may be inaccessible without the supplied secret key 810. In some embodiments, no other deployments use the secret key (only the update/migration job). This may prevent accidental access to the API by other autonomous services. The API may authenticate the job using the secret key (block 910) and call a permission setting procedure (block 912) that issues commands to update the tenancy graph stored in the graph database 108 (block 914).

At some point, an administrator may wish to rollback to an earlier version of the permission set. Accordingly, the administrator may issue a command identifying the earlier version of the permission set, which may be detected by the tenancy system 804. Upon recognizing this command (decision block 916), the tenancy system 804 may perform a rollback (block 918) as described above in connection with FIG. 7A and FIG. 7B. Processing may then proceed to done block 920 and terminate.

Figure 10:
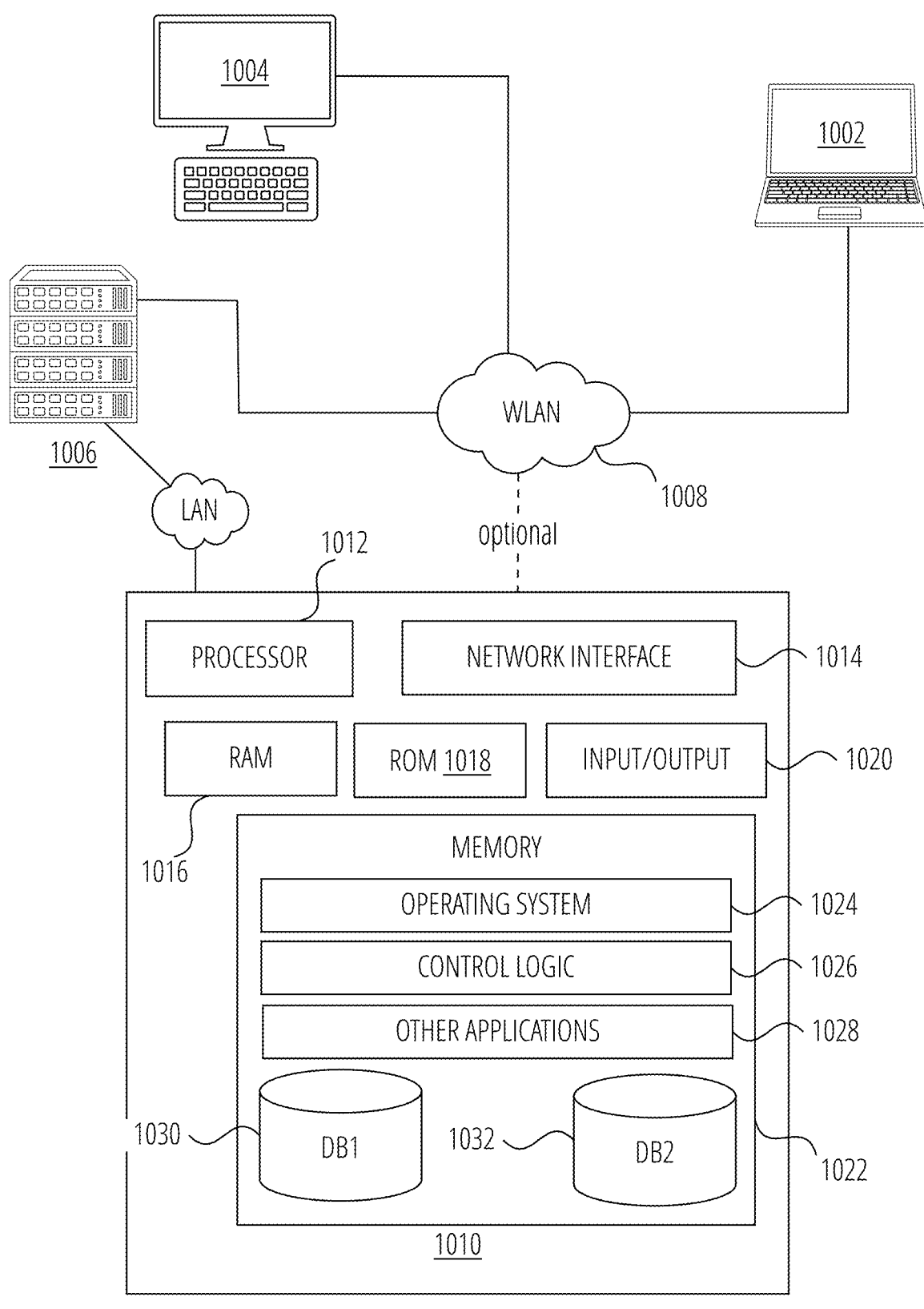
FIG. 10 depicts an illustrative computer system architecture that may be used to practice exemplary embodiments described herein.

FIG. 10 illustrates one example of a system architecture and data processing device that may be used to implement one or more illustrative aspects described herein in a standalone and/or networked environment. Various network nodes, such as the data server 1010, web server 1006, computer 1004, and laptop 1002 may be interconnected via a wide area network 1008 (WAN), such as the internet. Other networks may also or alternatively be used, including private intranets, corporate networks, LANs, metropolitan area networks (MANs) wireless networks, personal networks (PANs), and the like. Network 1008 is for illustration purposes and may be replaced with fewer or additional computer networks. A local area network (LAN) may have one or more of any known LAN topology and may use one or more of a variety of different protocols, such as ethernet. Devices data server 1010, web server 1006, computer 1004, laptop 1002 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1010, web server 1006, and client computer 1004, laptop 1002. Data server 1010 provides overall access, control and administration of databases and control software for performing one or more illustrative aspects described herein. Data server-data server 1010 may be connected to web server 1006 through which users interact with and obtain data as requested. Alternatively, data server 1010 may act as a web server itself and be directly connected to the internet. Data server 1010 may be connected to web server 1006 through the network 1008 (e.g., the internet), via direct or indirect connection, or via some other network. Users may interact with the data server 1010 using remote computer 1004, laptop 1002, e.g., using a web browser to connect to the data server 1010 via one or more externally exposed web sites hosted by web server 1006. Client computer 1004, laptop 1002 may be used in concert with data server 1010 to access data stored therein, or may be used for other purposes. For example, from client computer 1004, a user may access web server 1006 using an internet browser, as is known in the art, or by executing a software application that communicates with web server 1006 and/or data server 1010 over a computer network (such as the internet).

Servers and applications may be combined on the same physical machines, and retain separate virtual or logical addresses, or may reside on separate physical machines. FIG. 10 illustrates just one example of a network architecture that may be used, and those of skill in the art will appreciate that the specific network architecture and data processing devices used may vary, and are secondary to the functionality that they provide, as further described herein. For example, services provided by web server 1006 and data server 1010 may be combined on a single server.

Each component data server 1010, web server 1006, computer 1004, laptop 1002 may be any type of known computer, server, or data processing device. Data server 1010, e.g., may include a processor 1012 controlling overall operation of the data server 1010. Data server 1010 may further include RAM 1016, ROM 1018, network interface 1014, input/output interfaces 1020 (e.g., keyboard, mouse, display, printer, etc.), and memory 1022. Input/output interfaces 1020 may include a variety of interface units and drives for reading, writing, displaying, and/or printing data or files. Memory 1022 may further store operating system software 1024 for controlling overall operation of the data server 1010, control logic 1026 for instructing data server 1010 to perform aspects described herein, and other application software 1028 providing secondary, support, and/or other functionality which may or may not be used in conjunction with aspects described herein. The control logic may also be referred to herein as the data server software control logic 1026. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 1032 and a second database 1030. In some embodiments, the first database may include the second database (e.g., as a separate table, report, etc.). That is, the information can be stored in a single database, or separated into different logical, virtual, or physical databases, depending on system design. Web server 1006, computer 1004, laptop 1002 may have similar or different architecture as described with respect to data server 1010. Those of skill in the art will appreciate that the functionality of data server 1010 (or web server 1006, computer 1004, laptop 1002) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method for creating a tenancy in a service platform, the method comprising:

receiving a request to create the tenancy, the request comprising a list of requested users for the tenancy;

triggering a tenancy creation process that comprises provisioning a plurality of services or resources in the service platform, the tenancy creation process being divided into a plurality of independent stages that include:

a first stage that instructs a cloud service to create the tenancy, a second stage independent from the first stage in which the cloud service instructs a tenancy service to provision a user pool for the tenancy, the user pool representing registered users who are assigned permissions that allow the registered user to access resources or services associated with the tenancy, and a third stage independent of the first stage and the second stage that creates the registered users for the user pool;

processing the first stage of the plurality of independent stages;

placing a first message on a message queue after the first stage is completed and retrieving, by the tenancy service, the first message from the message queue;

processing the second stage with the tenancy service to provision the user pool in response to the first message, the processing comprising creating the user pool;

placing a second message on the message queue by the tenancy creation service after the second stage is completed;

processing the third stage with the tenancy service to add the registered users to the user pool in response to the second message, where processing the third stage comprises:

progressing through the list of requested users from the request to create the tenancy, for each requested user in the list of requested users, creating a credential for the user with the resources or services associated with the tenancy, and logging a success when the credential is created in a log;

detecting that the third stage has failed;

retrieving a retry policy uniquely associated with the third stage, the retry policy comprising consulting the log to determine how far into the list of requested users the tenancy service has progressed, and continuing adding the registered users to the user pool from a last successfully registered user; and processing the retry policy.

2. The computer-implemented method of claim 1, wherein each of the plurality of independent stages ends by placing a message on a message queue of the service platform, the message configured to trigger an initiation of a subsequent stage of the plurality of independent stages.

3. The computer-implemented method of claim 1, wherein the tenancy is created for an organization that is modeled as a plurality of teams, and permissions in the service platform are assigned to the plurality of teams.

4. The computer-implemented method of claim 3, wherein relationships within the organization are modeled by a graph database.

5. The computer-implemented method of claim 3, wherein at least one of the permissions is modeled as:

a node in a graph, the permission node being connected to corresponding team nodes by edges in the graph, the permission node representing access rights for the corresponding team nodes, or an edge in the graph that connects a user node in the graph to one or more folder nodes in the graph, each folder node corresponding to a folder of data that connected user nodes are permitted to access based on rights associated with the permission edge.

6. A non-transitory computer-readable storage medium, the computer-readable storage medium including instructions that when executed by a computer, cause the computer to:

receive a request to create the tenancy, the request comprising a list of requested users for the tenancy;

trigger a tenancy creation process that comprises provisioning a plurality of services or resources in the service platform, the tenancy creation process being divided into a plurality of independent stages that include:

a first stage that instructs a cloud service to create the tenancy, a second stage independent from the first stage in which the cloud service instructs a tenancy service to provision a user pool for the tenancy, the user pool representing registered users who are assigned permissions that allow the registered user to access resources or services associated with the tenancy, and a third stage independent of the first stage and the second stage that creates the registered users for the user pool;

process the first stage of the plurality of independent stages;

place a first message on a message queue after the first stage is completed and retrieving, by the tenancy service, the first message from the message queue;

process the second stage with the tenancy service to provision the user pool in response to the first message, the processing comprising creating the user pool;

place a second message on the message queue by the tenancy creation service after the second stage is completed;

process the third stage with the tenancy service to add the registered users to the user pool in response to the second message, where processing the third stage comprises:

progressing through the list of requested users from the request to create the tenancy, for each requested user in the list of requested users, creating a credential for the user with the resources or services associated with the tenancy, and logging a success when the credential is created in a log;

detect that the third stage has failed;

retrieve a retry policy uniquely associated with the third stage, the retry policy comprising consulting the log to determine how far into the list of requested users the tenancy service has progressed, and continuing adding the registered users to the user pool from a last successfully registered user; and process the retry policy.

7. The computer-readable storage medium of claim 6, wherein each of the plurality of independent stages ends by placing a message on a message queue of the service platform, the message configured to trigger an initiation of a subsequent stage of the plurality of independent stages.

8. The computer-readable storage medium of claim 6, wherein the tenancy is created for an organization that is modeled as a plurality of teams, and permissions in the service platform are assigned to the plurality of teams.

9. The computer-readable storage medium of claim 8, wherein relationships within the organization are modeled by a graph database.

10. The computer-readable storage medium of claim 8, wherein at least one of the permissions is modeled as:

a node in a graph, the permission node being connected to corresponding team nodes by edges in the graph, the permission node representing access rights for the corresponding team nodes, or an edge in the graph that connects a user node in the graph to one or more folder nodes in the graph, each folder node corresponding to a folder of data that connected user nodes are permitted to access based on rights associated with the permission edge.

11. A computing apparatus comprising:

a processor; and a memory storing instructions that, when executed by the processor, configure the apparatus to:

receive a request to create the tenancy, the request comprising a list of requested users for the tenancy;

trigger a tenancy creation process that comprises provisioning a plurality of services or resources in the service platform, the tenancy creation process being divided into a plurality of independent stages that include:

a first stage that instructs a cloud service to create the tenancy, a second stage independent from the first stage in which the cloud service instructs a tenancy service to provision a user pool for the tenancy, the user pool representing registered users who are assigned permissions that allow the registered user to access resources or services associated with the tenancy, and a third stage independent of the first stage and the second stage that creates the registered users for the user pool;

process the first stage of the plurality of independent stages;

place a first message on a message queue after the first stage is completed and retrieving, by the tenancy service, the first message from the message queue;

process the second stage with the tenancy service to provision the user pool in response to the first message, the processing comprising creating the user pool;

place a second message on the message queue by the tenancy creation service after the second stage is completed;

process the third stage with the tenancy service to add the registered users to the user pool in response to the second message, where processing the third stage comprises:

progressing through the list of requested users from the request to create the tenancy, for each requested user in the list of requested users, creating a credential for the user with the resources or services associated with the tenancy, and logging a success when the credential is created in a log;

detect that the third stage has failed;

retrieve a retry policy uniquely associated with the third stage, the retry policy comprising consulting the log to determine how far into the list of requested users the tenancy service has progressed, and continuing adding the registered users to the user pool from a last successfully registered user; and process the retry policy.

12. The computing apparatus of claim 11, wherein each of the plurality of independent stages ends by placing a message on a message queue of the service platform, the message configured to trigger an initiation of a subsequent stage of the plurality of independent stages.

13. The computing apparatus of claim 11, wherein the tenancy is created for an organization that is modeled as a plurality of teams, and permissions in the service platform are assigned to the plurality of teams.

14. The computing apparatus of claim 13, wherein at least one of the permissions is modeled as:

a node in a graph, the permission node being connected to corresponding team nodes by edges in the graph, the permission node representing access rights for the corresponding team nodes, or an edge in the graph that connects a user node in the graph to one or more folder nodes in the graph, each folder node corresponding to a folder of data that connected user nodes are permitted to access based on rights associated with the permission edge.

* * * * *